Oct. 24, 1961 — S. M. BOWEN — 3,005,619
CHUCK UNITS FOR A TIRE SPREADER
Filed Sept. 29, 1958 — 2 Sheets-Sheet 1

INVENTOR.
Silas M. Bowen
BY
ATTYS

Oct. 24, 1961  S. M. BOWEN  3,005,619
CHUCK UNITS FOR A TIRE SPREADER
Filed Sept. 29, 1958  2 Sheets-Sheet 2

INVENTOR.
Silas M. Bowen
BY
ATTYS

United States Patent Office 3,005,619
Patented Oct. 24, 1961

3,005,619
CHUCK UNITS FOR A TIRE SPREADER
Silas M. Bowen, Acampo, Calif., assignor to Super Mold Corporation of California, Lodi, Calif., a corporation of California
Filed Sept. 29, 1958, Ser. No. 763,914
1 Claim. (Cl. 254—50.3)

This invention relates to a tire spreader for the purpose of supporting the tire and spreading the beads whereby to reduce the outside diameter of the tire to permit its insertion in or removal from an endless, band-type retreading mold; the present invention being a modification of the device shown in the copending application of Arnold Duerksen on Mobile Tire Spreader, Serial No. 662,629, filed May 31, 1957, and now Patent No. 2,977,092.

The present invention is directed particularly to the tire supporting chuck units of the spreader, and the major object of the invention is to provide chuck units of simplified form over those previously employed, while still enabling such units to be used with tires of varying bead diameter.

Another object of the invention is to construct the chuck units so that no initial adjustment of any part is necessary preparatory to mounting a tire thereon, while the chuck jaws—when expanded and engaged with the tire beads—will be automatically held from retraction.

An additional object of the invention is to provide a tire spreader arranged so that when the spreading of a tire has been effected, and it is desired to withdraw the spreader from the tire, an easily performed hand operation causes the chuck jaws to readily retract.

Another object of the invention is to provide chuck units, for a tire spreader, which are designed for ease and economy of manufacture.

It is also an object of the invention to provide practical, reliable, and durable chuck units, for a tire spreader, and units which are exceedingly effective for the purpose for which they are designed.

These objects are accomplished by means of such structure and relative arrangement of parts as will fully appear by a perusal of the following specification and claim.

Figure 1:
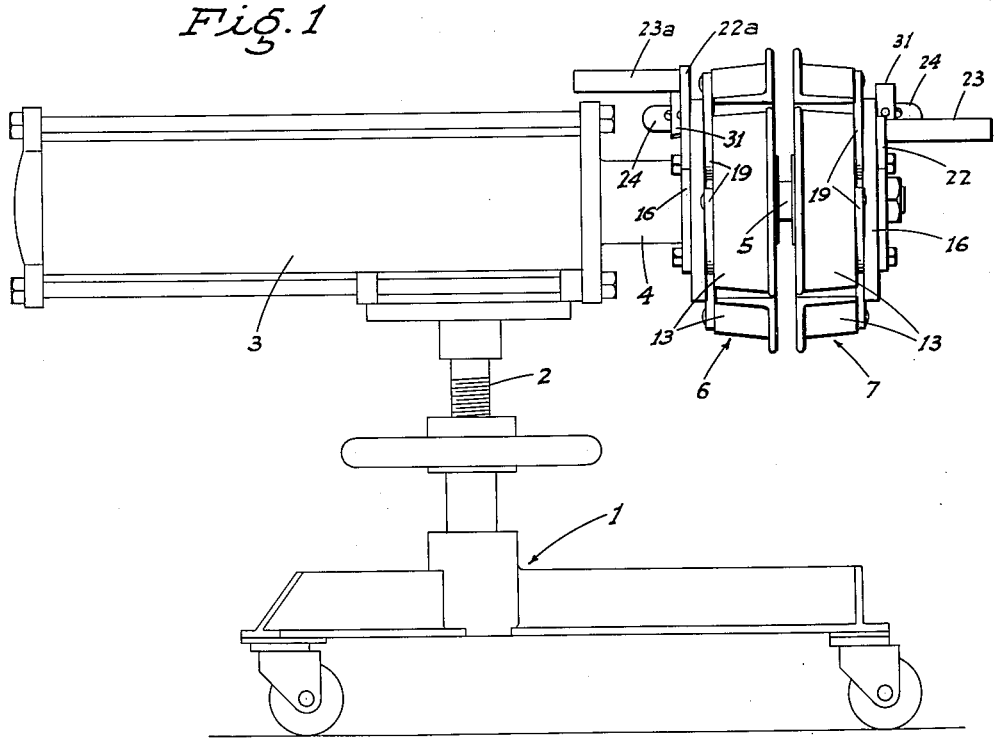
FIG. 1 is a side elevation of the improved chuck units of the spreader, showing the chuck jaws in a retracted position and as mounted in connection with a carriage-supported spreading ram.
Figure 4:
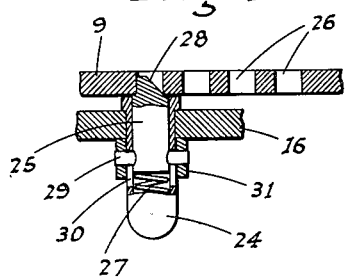
FIG. 4 is a fragmentary section substantially on line 4—4 of FIG. 2.

Referring now more particularly to the drawings, and to the characters of reference marked thereon, and at present to FIGS. 1–5, the supporting structure for the chuck units, as hereinafter described, may be of various types, but as here shown comprise a mobile base 1 having an upstanding vertically adjustable spindle 2 which supports the cylinder 3 of a horizontally disposed hydraulic ram. A hub 4 projects from one end of the cylinder, and the piston rod 5 of the ram projects from said hub.

A pair of chuck units which engage and enable the tire to be spread, are disposed ahead of the ram. These chuck units, indicated generally at 6 and 7, are placed back to back; unit 6 being mounted on the cylinder hub 4, while unit 7 is mounted on the piston rod 5.

As the chuck units 6 and 7 are otherwise of identical construction, a description of the front unit 7 will suffice for both. Such unit 7, as shown particularly in FIGS. 1 and 3, comprises a body 8 which includes a disc 9, provided with a central hub 10 in which the outer end of the piston rod 5 is secured; the hub 10 projecting ahead of the disc 9, as clearly shown in FIG. 3.

The body 8 behind the disc is formed with a plurality of evenly circumferentially spaced radial guide sleeves or sockets 11 in which radially outwardly projecting bars or spokes 12 are slidable. Fixed on each bar 12 at its outer end is a chuck jaw 13 in the form of a tire-bead engaging ring segment; the circumferential extent of the various segments being such as to enable free expanding and contracting movement of the jaws. Each jaw 13 comprises a tire bead supporting surface 14 and an outwardly projecting flange 15 at the back.

Figure 3:
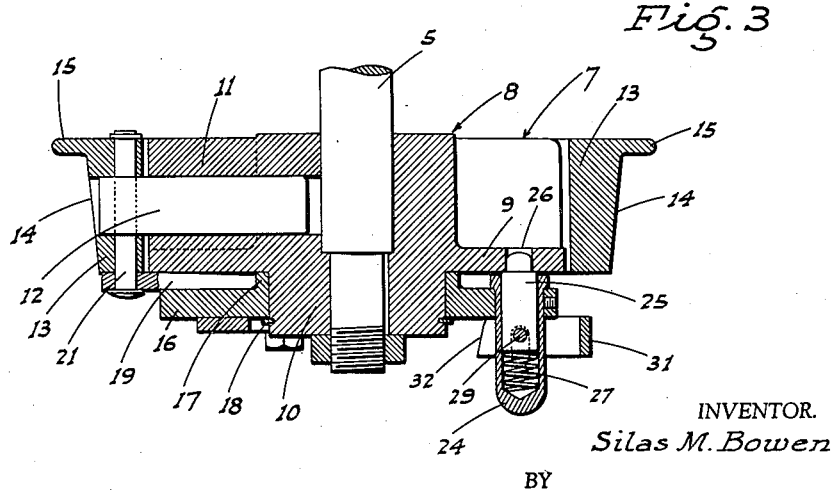
FIG. 3 is a cross section on line 3—3 of FIG. 2.

A jaw control disc 16 is turnably mounted on the central hub 10 in front of disc 9, and is held spaced from the disc 9 by means of a narrow hub 17 on said disc 16, as shown in FIG. 3. A snap ring 18 on the central hub 10, in front of disc 16, retains the latter in place.

Figure 2:
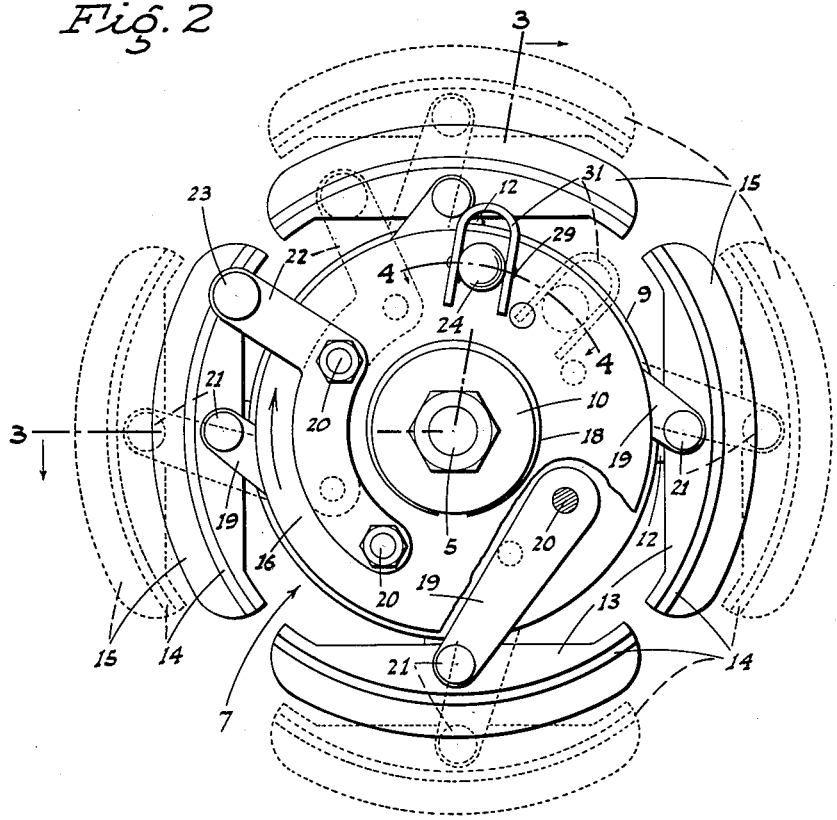
FIG. 2 is an enlarged front end elevation of the outer chuck unit, partly broken out, and showing the chuck jaws retracted.

Links 19, one for each chuck jaw 13, project outwardly from between discs 9 and 16 and are pivoted at their inner ends on the latter, as shown at 20. At their outer ends, the links are connected by pivot pins 21 to the related chuck jaws 13 in radial alinement with the bars 12. The length of the links is such that when—upon suitable rotation of the control disc 16—said links approach a position radially of the chuck, the jaws 13 are then fully expanded. Conversely, the jaws 13 are contracted or pulled in upon reverse rotation of the control disc 16, and which disposes the links at a decided angle to a radial position, as shown in FIG. 2. The body 8 is non-turnable and remains stationary upon rotation of the control disc 16 in one direction or the other.

In order to thus rotate the control disc 16 a radial arm 22 is secured on and projects from the outer face of said disc; a handle 23—parallel to the axis of the chuck—projecting forwardly from the arm. In the front chuck unit 7, the length of arm 22 is such that the handle is disposed radially inward from the position occupied by the flange 15 of the chuck jaws 13 when fully contracted, as shown in FIG. 2. This is necessary to enable the smallest rim-size tire, with which the spreader is adapted to be used, to be placed on and removed from the front chuck without obstruction. With the back chuck unit 6, the above arrangement is unnecessary, and the handle supporting arm 22a may be considerably longer, so that the handle 23a will clear the ram and cylinder, as shown in FIG. 1.

To releasably hold the chuck jaws 13 fixed in any one of the various tire engaging positions they may assume, and depending on the rim or bead-diameter of the tire being mounted on the spreader, the following device is provided:

Mounted on control disc 16 and projecting outwardly therefrom is a tubular housing 24, closed at its outer end and disposed with its axis parallel to that of said disc. Slidable in the housing is a locking or holding pin 25, adapted at its rear or inner end to enter any one at a time of a row of holes 26 in disc 9, said holes extending in a path concentric with the axis of the control disc 16. One endmost hole is disposed so that when the locking pin enters the same, the control disc is in a position to fully retract the chuck jaws 13, as shown in FIG. 2. The other holes of the row are so relatively spaced that when the locking pin enters any one of the same, the control disc 16 will be held in a position such that the chuck jaws 13 will be advanced to firmly engage the beads of a tire of a certain bead diameter.

To cause the locking pin 25 to yieldably advance, a compression spring 27 is mounted in the housing 24 under the pin, and to enable said pin to snap into and out of the holes as the control disc is rotated in a direction to expand the chuck jaws, the leading side of the hole-engaging portion of the locking pin is beveled, as shown at 28.

To prevent rotation of the pin 25 in the housing, said pin is provided adjacent its base with a diametral or cross pin 29 riding in longitudinal slots 30 in the housing in front and clear of disc 16. A finger yoke 31 straddles the housing 24 and is pivoted intermediate its ends on the cross pin 29. This yoke is arranged so that it will lie parallel to and against the disc 16 when the locking pin 25 is seated in a hole 26; the outer end of the yoke then projecting beyond the periphery of the disc 16 for proper finger grasping, as shown in FIG. 1.

When said end of the yoke 31 is grasped and pulled away from the adjacent face of the disc, the other end face 32 of said yoke, which is cut on a diagonal, as shown in FIG. 3, is brought into engagement with the face of the disc and the locking pin will be drawn out of whatever hole 26 it may be in at that time.

Figure 5:
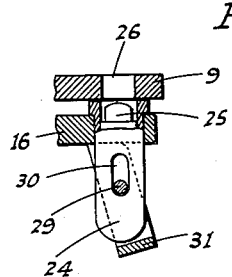
FIG. 5 is a fragmentary cross section, taken on the same plane as FIG. 3, showing the holding or locking pin in a retracted position.

The diagonal-cut end 32 of the yoke 31 is arranged so that when said yoke has been swung to thus move the locking pin clear of the holes and disc 16, the pressure of the spring 27 will act through the locking pin to maintain said end 32 of the yoke in flat contact with the disc 16, as shown in FIG. 5. It is therefore unnecessary to maintain finger pressure on the yoke in order to hold the locking pin released.

In operation, when it is desired to place a tire to be spread on the chuck units 6 and 7, said units are first moved into close relationship, as shown in FIG. 1, by retraction of the piston rod 5. The chuck jaws 13 of both units are initially fully retracted, with the locking pin 25 engaged in the first hole 26.

The tire to be spread—of whatever bead diameter it may be—is then placed over the jaws of the chuck units; the flanges 15 of the jaws 13 then being of a smaller radius than the bead-diameter of the tire. Nextly, the handles 23 and 23a of the units are manipulated to rotate the corresponding control discs 16 in a direction to straighten out the links 19 and advance or expand the chuck jaws. With such rotation of each control disc 16, the locking pin 25 will move in and out of the successive holes 26 until the bead engaging faces 14 of the jaws 13 firmly engage the adjacent bead of the tire.

When such engagement is obtained, the locking pin will drop into the corresponding hole 26, and the control disc 16 and links 19 will be held against rotation in a chuck retracting direction.

The piston rod 5 is then advanced to separate the chuck units 6 and 7 from each other, which spreads the beads apart axially and reduces the outside diameter of the tire to enable the same to be inserted in (or removed from) an endless band-type retreading mold.

When it is desired to retract the jaws 13 to their initial or starting position, and so that the chuck units will clear the tire beads, the locking pin 25 is first withdrawn from the hole 26 by manipulation of the yoke 31, as previously described, and thereafter disc 16 is rotated in a reverse direction.

Figure 6:
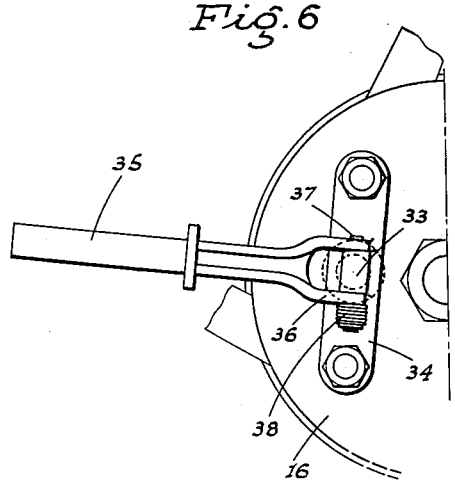
FIG. 6 is a fragmentary front end elevation of a chuck unit, showing a modified form of jaw expanding and retracting handle.

If greater disc-turning leverage is required than is afforded by the necessarily short handle-supporting arm 22, the construction shown in FIG. 6 may be employed. In this arrangement, the fixed arm 22 is eliminated, and a hinge sleeve 33—whose axis is at right angles to a line radially of the chuck 7—is secured on a plate 34 attached to the outer face of the control disc 16.

A handle 35, of any desired length, is disposed to extend radially of the chuck, and is formed at its inner end with a fork 36 which straddles the sleeve 33 and is mounted on a hinge pin 37.

A spring 38 is suitably arranged in connection with the hinge pin to offer yieldable resistance to the rotation of the handle about the hinge pin as an axis. With this arrangement, the handle 35 may be positioned so as to extend radially of the chuck for operation, or it may be swung so as to lie parallel to the axis of the chuck and then be out of the way when a tire is being placed on or removed from the chuck.

From the foregoing description it will be readily seen that there have been produced chuck units which will substantially fulfill the objects of the invention, as set forth herein.

While this specification sets forth the present and preferred construction of the chuck units, still in practice such deviations therefrom may be resorted to as do not form a departure from the spirit of the invention, as defined by the appended claim.

Having thus described the invention, the following is claimed as new and useful, and upon which Letters Patent are desired:

In a chuck unit for a tire spreader and which unit includes a body, a plurality of chuck jaws movably supported from the body for expanding and contracting movement relative thereto, and a control disc turnably mounted on the body and the rotation of which controls the movement of the jaws; a releasable locking device between the disc and body comprising a locking pin parallel to the axis of the disc, a housing mounted on the disc and projecting away from the body and in which the pin is slidable, a spring in the housing urging the pin toward the body, the latter having a hole into which the pin normally projects, a cross pin mounted in the locking pin and projecting through longitudinal slots in the housing, and a finger yoke straddling the housing and pivoted intermediate its ends on the ends of the cross pin, said yoke at one end being arranged to engage the outer face of the disc upon turning the yoke from a position crosswise of the housing to a position generally lengthwise thereof, the locking pin being retracted in said last named position of the yoke, and the latter then being releasably maintained in said last named position under the influence of the spring.

References Cited in the file of this patent

UNITED STATES PATENTS

| 807,965 | Rice | Dec. 19, 1905 |
|---|---|---|
| 1,542,082 | Nelson | June 16, 1925 |
| 1,688,582 | Heinrich | Oct. 23, 1928 |
| 1,868,972 | Erdahl | July 26, 1932 |
| 2,353,570 | Kraft | July 11, 1944 |
| 2,655,977 | Hodgkins | Oct. 20, 1953 |

FOREIGN PATENTS

| 1,005,281 | France | Dec. 19, 1951 |
|---|---|---|
| 667,603 | Germany | Nov. 15, 1938 |